(12) United States Patent
Kim et al.

(10) Patent No.: US 8,748,031 B2
(45) Date of Patent: Jun. 10, 2014

(54) RECHARGEABLE BATTERY HAVING MULTIPLE CASES

(75) Inventors: Yong-Sam Kim, Yongin-si (KR); Jeong-Won Oh, Yongin-si (KR); Yoon-Tai Kwak, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 524 days.

(21) Appl. No.: 13/072,018

(22) Filed: Mar. 25, 2011

(65) Prior Publication Data

US 2012/0052371 A1 Mar. 1, 2012

(30) Foreign Application Priority Data

Aug. 30, 2010 (KR) .................. 10-2010-0084244

(51) Int. Cl.
*H01M 2/30* (2006.01)
*H01M 2/04* (2006.01)
*H01M 2/02* (2006.01)

(52) U.S. Cl.
USPC ........................... 429/163; 429/161; 429/179

(58) Field of Classification Search
USPC ........................................ 429/161, 163, 179
See application file for complete search history.

(56) References Cited

U.S. PATENT DOCUMENTS

| 6,040,082 | A | 3/2000 | Haas et al. |
| 7,563,535 | B2 | 7/2009 | Hiratsuka |
| 2006/0214632 | A1 | 9/2006 | Lee et al. |
| 2009/0087692 | A1 | 4/2009 | Park et al. |
| 2010/0209750 | A1* | 8/2010 | Nagamatsu et al. ............ 429/94 |

FOREIGN PATENT DOCUMENTS

| DE | 198 32 969 A1 | 2/1999 |
| EP | 1 995 803 A1 | 11/2008 |
| JP | 01-115065 A | 5/1989 |
| JP | 11-204115 | 7/1999 |
| JP | 2001-068161 | 6/2001 |
| JP | 2003-303580 A | 10/2003 |
| JP | 2006-278245 | 10/2006 |
| JP | 2009-48966 A | 3/2009 |
| KR | 1998-051244 | 10/1998 |

OTHER PUBLICATIONS

KIPO Office action dated Nov. 24, 2011, for Korean priority Patent application 10-20100084244, noting listed references in this IDS, 3 pages.
Patent Abstracts of Japan, and English machine translation of Japanese publication 11-204115, listed above, 14 pages.
Patent Abstracts of Japan, and English machine translation of Japanese publication 2001-068161, listed above, 12 pages.
Patent Abstracts of Japan, and English machine translation of Japanese publication 2006-278245, listed above, 24 pages.
EPO Extended Search Report dated Feb. 6, 2012 for EP 11166182.3 (5 pages).

* cited by examiner

*Primary Examiner* — Ula C Ruddock
*Assistant Examiner* — Frank Chernow
(74) *Attorney, Agent, or Firm* — Christie, Parker & Hale, LLP

(57) ABSTRACT

A rechargeable battery includes an electrode assembly having a first electrode and a second electrode, a first case housing the electrode assembly and electrically coupled to the first electrode, and a second case electrically insulated from the first case and housing the first case, wherein the second case is electrically coupled to the second electrode.

12 Claims, 11 Drawing Sheets

RECHARGEABLE BATTERY HAVING MULTIPLE CASES

CROSS-REFERENCE TO RELATED APPLICATION

This application claims priority to and the benefit of Korean Patent Application No. 10-2010-0084244 filed in the Korean Intellectual Property Office on Aug. 30, 2010, the entire content of which are incorporated herein by reference.

BACKGROUND

1. Field

The disclosure relates to a rechargeable battery.

2. Description of the Related Art

A rechargeable battery is a battery that can be repetitively charged and discharged, unlike a primary battery which cannot be recharged. Low-capacity rechargeable batteries may be used for portable compact electronic apparatus such as mobile phones or notebook computers and camcorders and high-capacity rechargeable batteries may be used as a power supply for driving a motor of a hybrid vehicle, etc.

In recent years, a high-output rechargeable battery using a non-aqueous liquid electrolyte of high energy density has been developed. The high-output rechargeable battery may be used to drive an apparatus requiring high power, i.e., a motor of an electric vehicle, or the like.

When a conductive foreign material such as a nail, a gimlet, or the like penetrates the rechargeable battery from the outside of the rechargeable battery, or if a press fracture occurs, a short-circuit may occur inside of the rechargeable battery. When the short-circuit occurs, the internal temperature of the rechargeable battery rapidly increases to cause a risk that the rechargeable battery will be catch fire or explode.

The above information disclosed in this Background section is only for enhancement of understanding of the background of the described technology and therefore it may contain information that does not form the prior art that is already known in this country to a person of ordinary skill in the art.

SUMMARY

The described technology provides a rechargeable battery that improves safety against press fracture of conductive foreign materials.

According to an aspect of the present invention, a rechargeable battery is provided that includes an electrode assembly having a first electrode and a second electrode, a first case housing the electrode assembly and electrically coupled to the first electrode, and a second case electrically insulated from the first case and housing the first case, wherein the second case is electrically coupled to the second electrode.

In one embodiment, the first case is a rectangular parallelepiped having a first opening at one side configured to receive the electrode assembly, and the second case is a rectangular parallelepiped having a second opening generally opposite to the first opening, the second opening configured to receive the first case. Further, an insulator may be located between the first case and the second case and the insulator may be an insulating film, an oxide film, or a coating film.

In one embodiment, a cap plate is coupled to the second opening of the second case, wherein the first case is electrically coupled to a first electrode terminal coupled to the first electrode, and wherein the second case is electrically coupled to a second electrode terminal coupled to the second electrode.

The rechargeable battery may also include a first electrode insulating member and a second electrode insulating member on the cap plate and a first electrode lead tab electrically coupled to the first electrode, wherein the first case is between the first electrode insulating member and the first electrode lead tab and is on the second electrode insulating member, and wherein the second electrode insulating member is outside of the first case. An insulator between the first case and the second case may be a rectangular parallelepiped having a third opening generally corresponding to the first opening, wherein the insulator is fixed between the first case and the first electrode insulating member, and wherein the insulator is outside of the second electrode insulating member and is on the first case.

According to the exemplary embodiment, since an electrode assembly is housed in a first case and the first case is housed in the second case, the first and second cases are first short-circuited and current charged in the electrode assembly is discharged with low resistance at the time of the infiltration of conductive foreign materials into the electrode assembly through the second case or press fracture. Accordingly, in a rechargeable battery, a firing risk can be prevented and safety can be improved.

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in FIG. 1 is a perspective view of a rechargeable battery according to a first exemplary embodiment of the present invention, FIG. 2 is a cross-sectional view taken along line II-II of FIG. 1, and FIG. 3 is a cross-sectional view taken along line III-III of FIG. 1.

Figure 1:
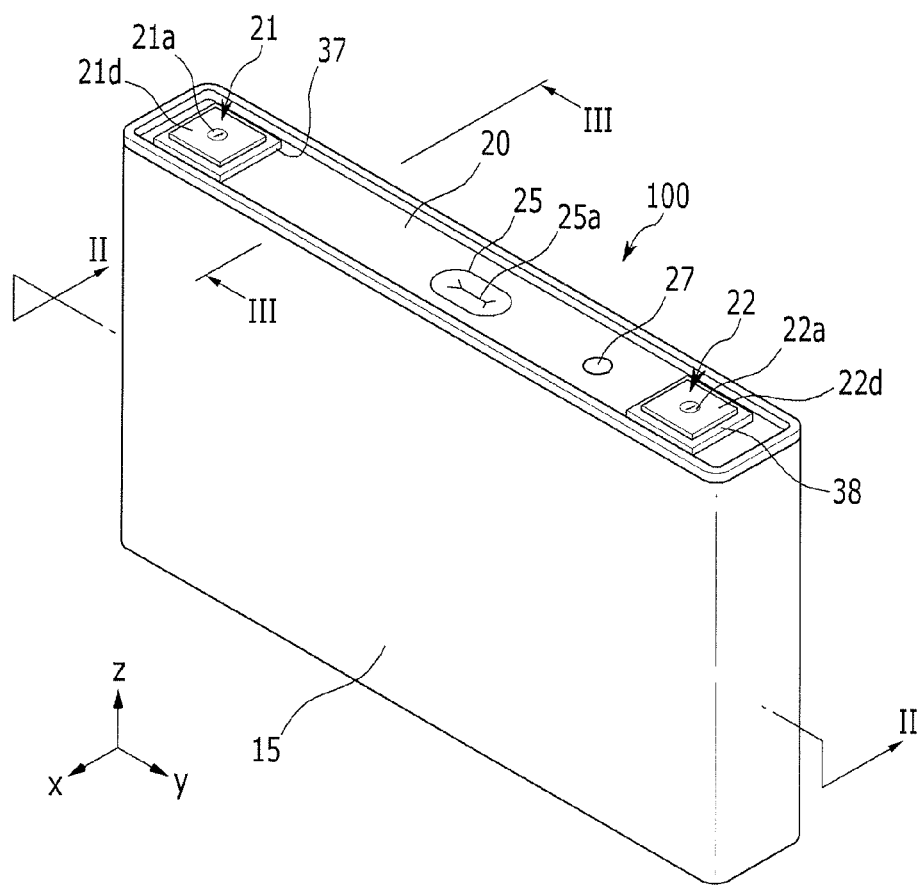
FIG. 1 is a perspective view of a rechargeable battery according to a first exemplary embodiment of the present invention.
Figure 2:
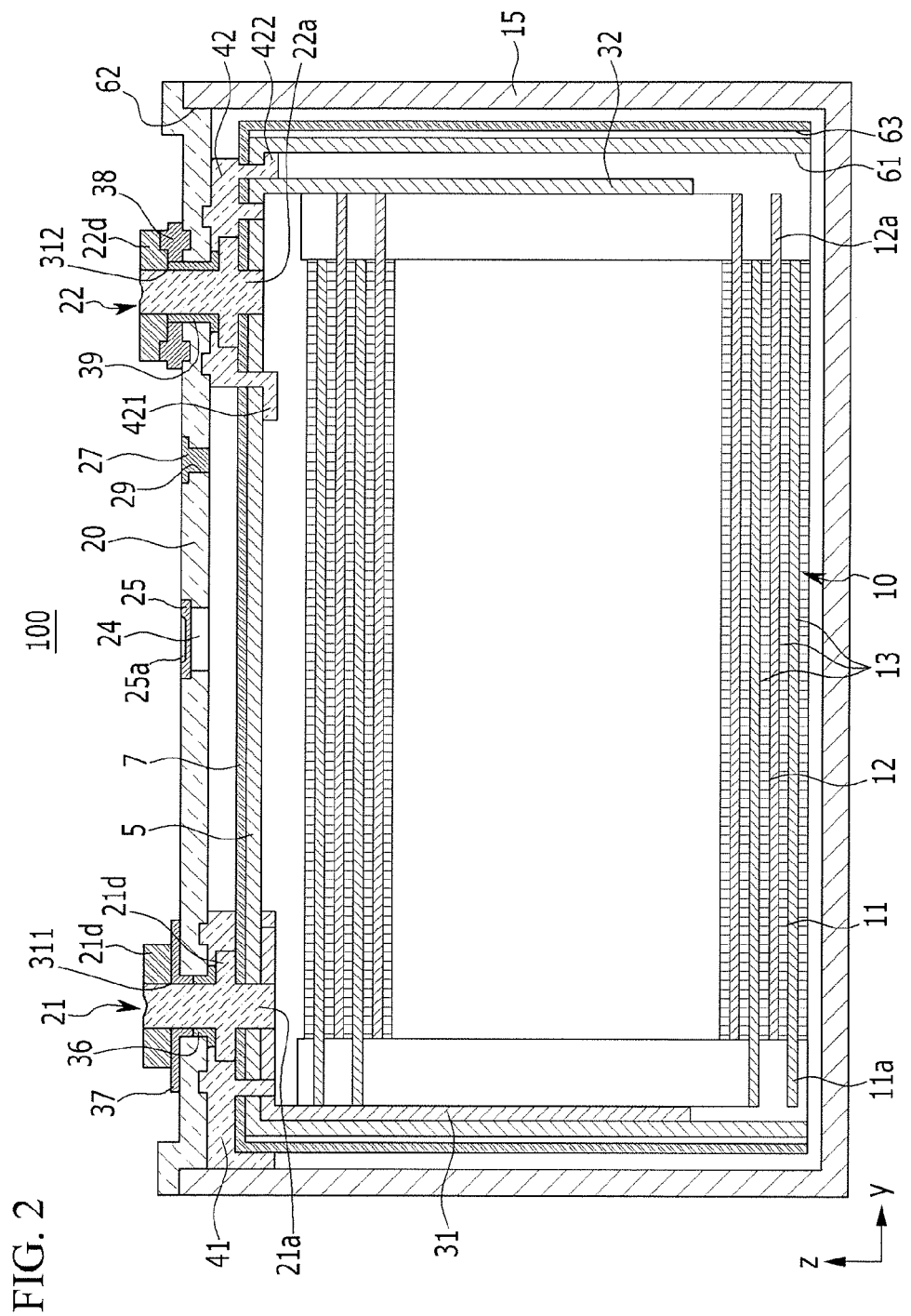
FIG. 2 is a cross-sectional view taken along line II-II of FIG. 1.
Figure 3:
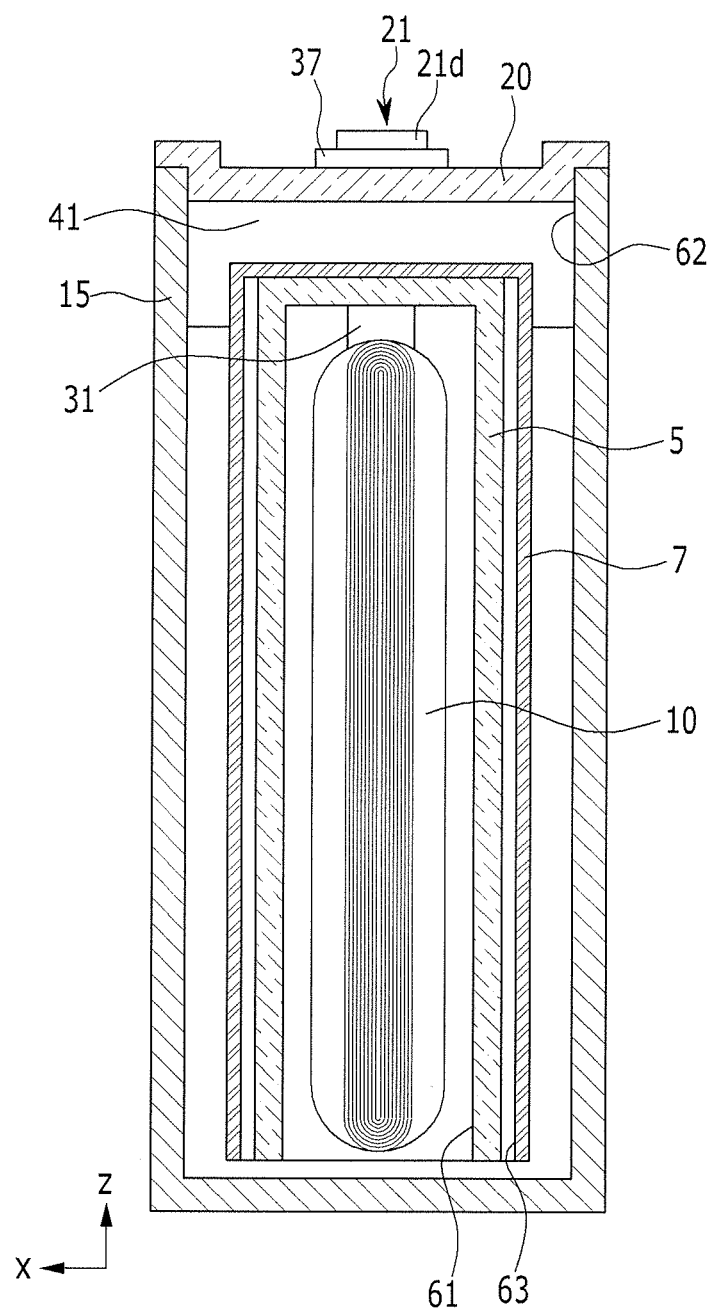
FIG. 3 is a cross-sectional view taken along line III-III of FIG. 1.

Referring to FIGS. 1 to 3, the rechargeable batter 100 according to the first exemplary embodiment includes an electrode assembly 10 that perform charging and discharging operations, a first case 5 housing the electrode assembly 10, and a second case 15 housing the first case 5.

A first opening 61 is formed at one side of the first case 5 to allow the electrode assembly 10 to be inserted into the first case 5 and the first case 5 has a rectangular parallelepiped shape forming an accommodation space of the electrode assembly 10. A second opening 62 is formed at one side of the second case 15 to allow the first case 5 to be inserted into the second case 15 and has the rectangular parallelepiped shape forming an accommodation space of an electrolytic solution.

While the first case 5 is housed in the second case 15, the first and second cases 5 and 15 are electrically insulated from each other. That is, the rechargeable battery 100 further includes an insulator 7 located between the first and second cases 5 and 15. The electrode assembly 10 is taped with, for example, an insulating tape to be electrically insulated from the first case 5 as described in the related art.

Figure 4:
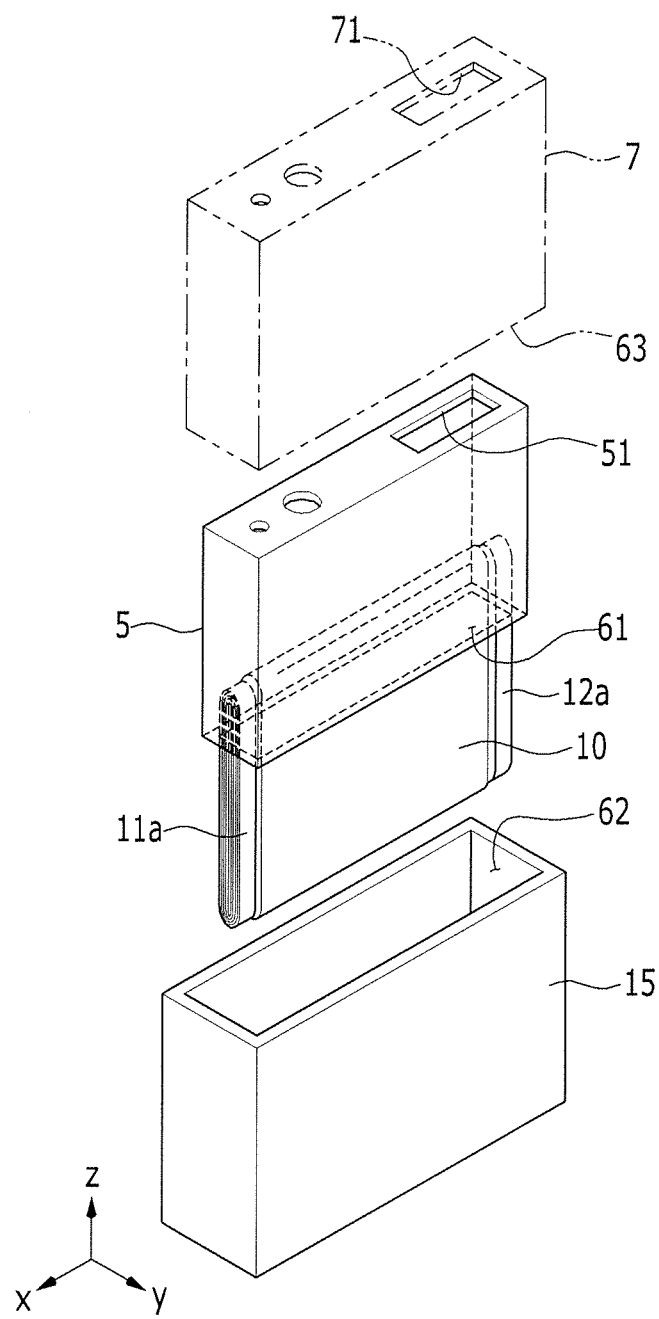
FIG. 4 is an exploded perspective view of the rechargeable battery of FIG. 1.

FIG. 4 is an exploded perspective view of the rechargeable battery of FIG. 1. Referring to FIGS. 2 to 4, while the first case 5 is housed in the second case 15, the first opening 61 and the second opening 62 are positioned at opposite sides. That is, the first opening 61 faces one side (lower side) of a z-axis direction of the rechargeable battery 100 and the second opening 62 faces the other side (upper side) of the z-axis direction of the rechargeable battery 100.

When the rechargeable battery 100 is installed, the conductive foreign material may infiltrate through the second case 15 or a press fracture may occur with respect to the second case 15. There is a higher possibility that the infiltration or press fracture of the conductive foreign material will occur on the side or top than the bottom of the rechargeable battery 100. Accordingly, the first and second cases 5 and 15 are opposed to each other in a direction in which there is a high possibility of the infiltration and press fracture of the conductive foreign material, such that improvement of safety may be maximized.

The insulator 7 may be located between the first and second cases 5 and 15 or may be formed by an insulating film attached to the outer surface of the first case 5 or the inner surface of the second case 15. Further, the insulator 7 may be formed on at least one surface of the opposed surfaces of the first and second cases 5 and 15 by an oxide film or an insulative coating film. For convenience, in FIGS. 2 and 3, the insulator 7 has the rectangular parallelepiped shape to generally correspond to the shape of the first case 5.

Referring back to FIGS. 1 to 3, the rechargeable battery 100 further includes a cap plate 20 coupled to the second opening 62 of the second case 15, and a first terminal (hereinafter, referred to as "negative terminal") 21 and a second terminal (hereinafter, referred to as "positive terminal") 22 that are installed in first and second terminal holes 311 and 312 of the cap plate 20.

The first and second cases 5 and 15 are electrically connected to different ones of the first and second terminals 21 and 22, respectively. For example, the first case 5 positioned inside of the rechargeable battery 100 is electrically connected to the negative terminal 21 and the second case 15 positioned outside of the rechargeable battery 100 is electrically connected to the positive terminal 21.

The electrode assembly 10 is formed by locating a first electrode (hereinafter, referred to as "negative electrode") 11 and a second electrode (hereinafter, referred to as "positive electrode") 12 on both surfaces of a separator 13 which is an insulator and winding the negative electrode 11, the separator 13, and the positive electrode 12 together in a jelly roll configuration.

Further, the electrode assembly may be assembled by laminating a negative electrode and a positive electrode each which is formed by a single plate with the separator located therebetween or assembled by bending and laminating the negative, the separator, and the positive electrode in zigzag.

Each of the negative electrode 11 and the positive electrode 12 includes a coated region where an active material is applied to a current collector formed by a metal plate and uncoated regions 11a and 12a formed by the exposed current collector without the active material thereon.

The uncoated region 11a of the negative electrode 11 is formed at one end of the negative electrode 11 on the wound negative electrode 11. The uncoated region 12a of the positive electrode 12 is formed at one end of the positive electrode 12 on the wound positive electrode 12. The uncoated regions 11a and 12a are located at both ends of the electrode assembly 10.

For example, the cap plate 20 is made of aluminum and installed at the second opening 62 of the second case 15 to seal the second case 15. The negative electrode 11 may be made of copper or the positive electrode 12 may be made of aluminum. The first case 5 connected to the negative electrode 11 may be made of copper and the second case 15 connected to the positive electrode 12 may be made of aluminum.

The conductive foreign material may penetrate and infiltrate the first and second cases 5 and 15 or in the press fracture, the first and second cases 5 and 15 may be short-circuited by conductive foreign material or press fracture. As such, if the first and second cases 5 and 15 are made thicker than the negative electrode 11 and the positive electrode 12, large current can flow on the first and second cases 5 and 15 with low resistance, and then the voltage of the electrode assembly 10 may be significantly reduced. Further, since the second case 15 and the cap plate 20 are made of the same material, the weldability of the cap plate 20 to the second opening 62 may be improved.

The cap plate 20 further includes an electrolytic solution inlet 29 and a vent hole 24. The electrolytic solution inlet 29 allows the electrolytic solution to be injected into the second case 15 after the cap plate 20 is coupled to the second case 15. After the electrolytic solution is injected, the electrolytic solution inlet 29 is sealed by a sealing plug 27.

The vent hole 24 enables the internal pressure of the rechargeable battery 100 to be discharged and is sealed by a vent plate 25. When the internal pressure of the rechargeable battery 100 reaches a threshold pressure, the vent plate 25 is opened. The vent plate 25 has a notch 25a inducing opening.

The negative terminal 21 and the positive terminal 22 penetrate the cap plate 20 and are electrically connected to the electrode assembly 10. In one embodiment, the negative terminal 21 is electrically connected to the negative electrode 11 of the electrode assembly 10 and the positive terminal 22 is electrically connected to the positive electrode 12 of the electrode assembly 10.

Electricity produced from the electrode assembly 10 is drawn from the second case 15 through the negative terminal 21 and the positive terminal 22. The first case 5 is electrically connected to the negative electrode 11 of the electrode assembly 10 through the negative terminal 21. The second case 15 is electrically connected to the positive electrode 12 of the electrode assembly 10 through the positive terminal 22.

Figure 5:
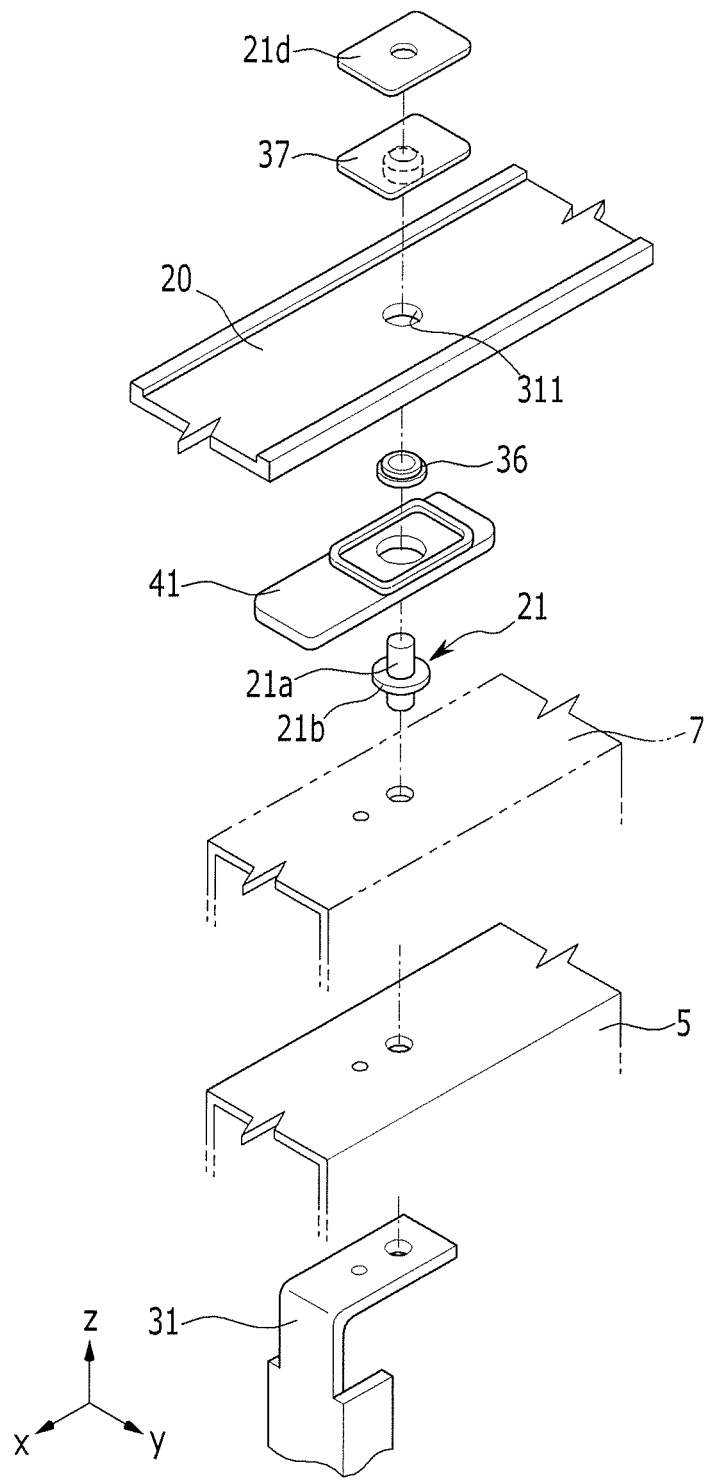
FIG. 5 is an exploded perspective view of a negative terminal of the rechargeable battery of FIG. 1.

FIG. 5 is an exploded perspective view of a negative terminal of the rechargeable battery of FIG. 1. Referring to FIG. 5, the negative terminal 21 includes a pole portion 21a installed in a first terminal hole 311 of the cap plate 20, a flange 21b formed at the pole portion 21a inside of the second case 15, and a terminal plate 21d which is located outside of the second case 15 and coupled to the pole portion 21a.

A negative gasket 36 and a negative insulator 37 are installed in the upper part and the lower part of the first terminal hole 311, respectively, between the pole portion 21a of the negative terminal 21 and the first terminal hole 311 of the cap plate 20 to seal the space between the pole portion 21a of the negative terminal 21 and the cap plate 20.

Further, the negative gasket 36 is located between the flange 21b and the cap plate 20 and then seals the space between the flange 21b and the cap plate 20. In other words, in the negative gasket 36, the negative terminal 21 is installed on the cap plate 20 to prevent the electrolytic solution from leaking through the first terminal hole 311.

The negative insulator 37 is located between the terminal plate 21d and the cap plate 20 and then electrically insulates the terminal plate 21d and the cap plate 20 from each other.

A first electrode lead tab (hereinafter, referred to as "negative lead tab") 31 allows the negative terminal 21 to be connected to the uncoated region 11a of the negative electrode 11 of the electrode assembly 10. By caulking the bottom of the pole portion 21a through coupling the negative lead tab 31 to the bottom of the pole portion 21a, the negative lead tab 31 is coupled to the bottom of the pole portion 21a in a conduction structure while being supported on the flange 21b.

A first electrode insulating member (hereinafter, referred to as "negative insulating member") 41 is installed between the negative lead tab 31 and the cap plate 20 to electrically insulate the negative lead tab 31 and the cap plate 20 from each other. Substantially, the first case 5 which is a conductor and the insulator 7 are further located between the negative lead tab 31 and the cap plate 20.

The first case 5 and the insulator 7 are located between the negative lead tab 31 and the negative insulating member 41 to be fixed to the negative terminal 21. In this case, the first case 5 contacts a surface of the negative lead tab 31 and the pole portion 21a is connected to the first case 5 through the negative lead tab 31. Therefore, the first case 5 is electrically connected to the negative terminal 21 and electrically insulated from the cap plate 20 by the insulator 7 and the negative insulating member 41.

Figure 6:
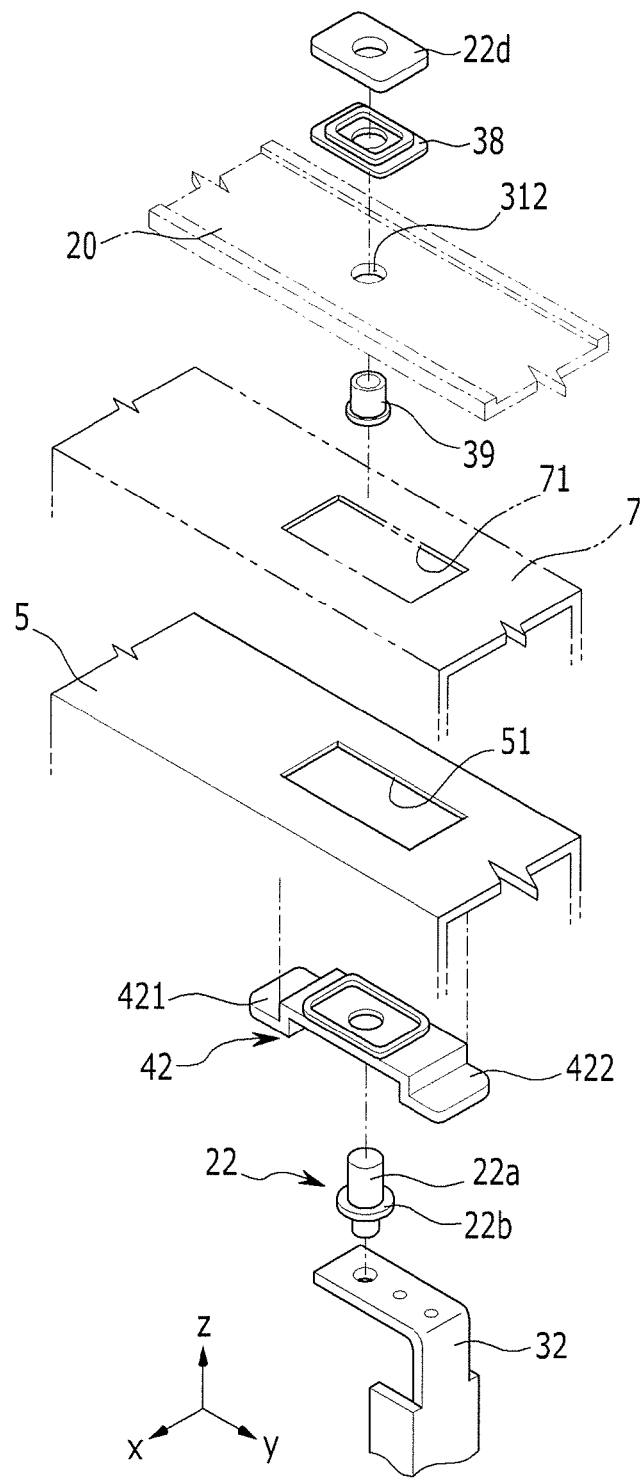
FIG. 6 is an exploded perspective view of a positive terminal of the rechargeable battery of FIG. 1.

FIG. 6 is an exploded perspective view of a positive terminal of the rechargeable battery of FIG. 1. Referring to FIGS. 4 and 6, the positive terminal 22 includes a pole portion 22a installed in a second terminal hole 312 of the cap plate 20, a flange 22b formed at the pole portion 22a inside of the second case 15, and a top plate 38 and a terminal plate 22d that are laminated outside of the second case 15 and coupled to the pole portion 22a.

A positive gasket 39 is installed between the pole portion 22a of the positive terminal 22 and the inner surface of the second terminal hole 312 of the cap plate 20 to seal the space between the pole portion 22a of the positive terminal 22 and the cap plate 20.

Further, the positive gasket 39 is located between the flange 22b and the cap plate 20 and seals the space between the flange 22b and the cap plate 20. The positive gasket 39 further extends between the pole portion 22a of the positive terminal 22 and the inner surface of a hole of the top plate 38 to seal the space between the pole portion 22a of the positive terminal 22 and the top plate 38. That is, in the positive gasket 39, the positive terminal 22 is installed on the cap plate 20 to prevent the electrolytic solution from leaking through the second terminal hole 312.

A second electrode lead tab (hereinafter, referred to as "positive lead tab") 32 allows the positive terminal 22 to be electrically connected to the uncoated region 12a of the positive electrode 12 of the electrode assembly 10. That is, by caulking the bottom of the pole portion 22a through coupling the positive lead tab 32 to the bottom of the pole portion 22a, the positive lead tab 32 is coupled to the bottom of the pole portion 22a in a conduction structure while being supported on the flange 22b.

A second electrode insulating member (hereinafter, referred to as "positive insulating member") 42 is installed between the positive lead tab 32 and the cap plate 20 to electrically insulate the positive lead tab 32 and the cap plate 20 from each other.

In this case, the positive lead tab 32, the pole portion 22a, the terminal plate 22d, and the top plate 38 are electrically connected to the second case 15 and electrically insulated from the first case 5.

The first case 5 and the insulator 7 are provided with through-holes 51 and 71 through which the positive insulating member 42 passes, respectively. Therefore, the first case 5 and the insulator 7 are suspended on suspending portions 421 and 422 formed at both sides of the positive insulating member 42 while being positioned outside of the positive insulating member 42 through the through-holes 51 and 71.

That is, the first case 5 is electrically connected to the negative terminal 21 and electrically insulated from the positive lead tab 32. The second case 15 is electrically connected to the positive terminal 22 and electrically insulated from the negative lead tab 31.

The first opening 61 of the first case 5 and a third opening 63 of the insulator 7 are located at the lower side of a z axis which is the same side and positioned at the upper side of the z axis which is an opposite side to the second opening 62 of the second case 15.

Hereinafter, other exemplary embodiments of the present invention will be described and the description of the same component will be omitted and different components are compared with each other by comparing with the first exemplary embodiment and the above-mentioned exemplary embodiments.

Figure 7:
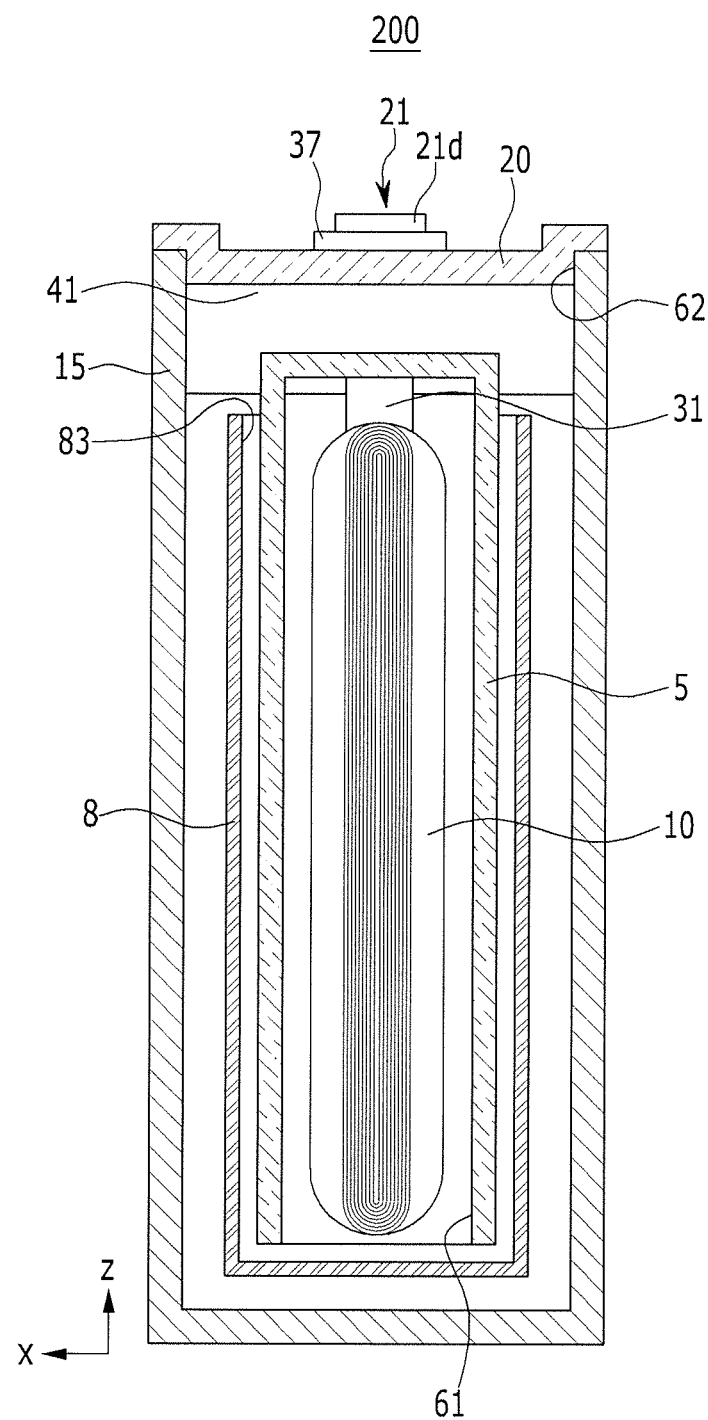
FIG. 7 is a cross-sectional view of a rechargeable battery according to a second exemplary embodiment of the present invention.

FIG. 7 is a cross-sectional view of a rechargeable battery 200 according to a second exemplary embodiment of the present invention. Referring to FIG. 7, an insulator 8 has a rectangular parallelepiped shape corresponding to the shape of the electrode assembly 10 and includes a third opening 83 at the second opening 62 of the second case 15.

The insulator 7 of the first exemplary embodiment is fixed to the negative terminal 21 and suspended on the positive terminal 22 to be housed in the first and second cases 5 and 15.

Contrary to this, the insulator 8 of the second exemplary embodiment is merely located between the first and second cases 5 and 15 to facilitate the installation of the insulator 8 and simplifies the structures of the negative terminal 21 and the positive terminal 22 on the inner surface of the cap plate 20.

Figure 8:
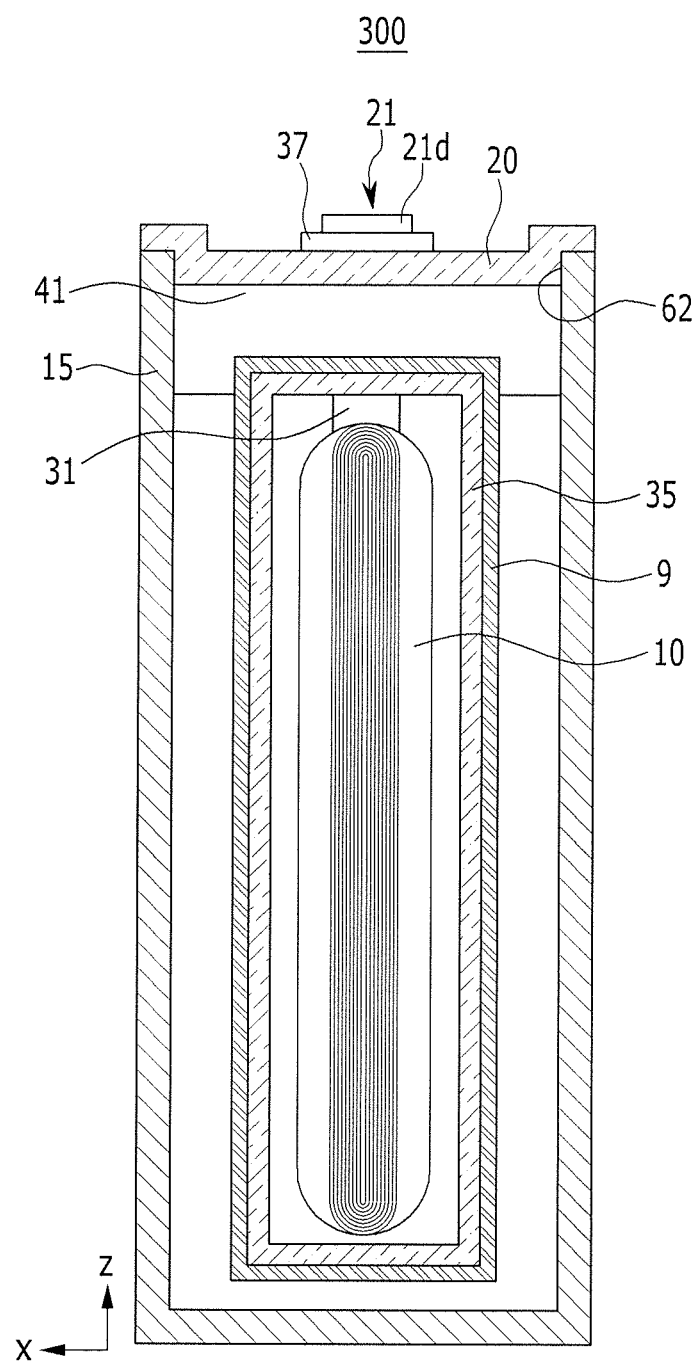
FIG. 8 is a cross-sectional view of a rechargeable battery according to a third exemplary embodiment of the present invention.
Figure 9:
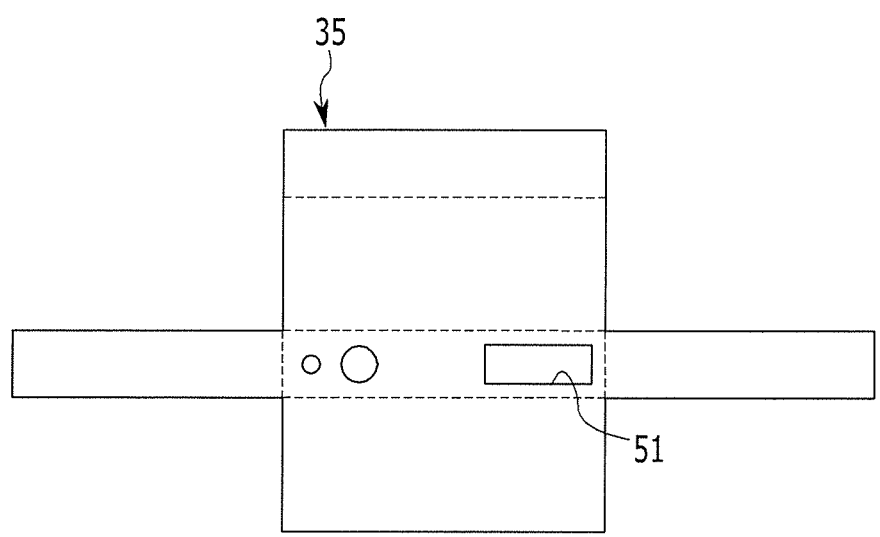
FIG. 9 is a development diagram of a first case applied to FIG. 8.

FIG. 8 is a cross-sectional view of a rechargeable battery 300 according to a third exemplary embodiment of the present invention and FIG. 9 is a development diagram of a first case 35 applied to FIG. 8. Referring to FIGS. 8 and 9, the first case 35 has a rectangular parallelepiped shape forming an accommodation space of the electrode assembly 10.

The first case 5 of the first exemplary embodiment includes the first opening 61 at one side of the rectangular parallelepiped, but the first case 35 of the second exemplary embodiment is formed in a rectangular parallelepiped without an opening. The first case 35 is formed to enable the installation of the negative terminal 21 and the positive terminal 22 and includes a through-hole 51 through which the positive insulating member 42 passes.

As shown in the development diagram of FIG. 9, the first case 35 is formed by bending a cut plate material in a rectangular parallelepiped shape. Edges of the bent plate materials that meet each other in the first case 35 may be welded to each other.

The insulator 7 of the first exemplary embodiment includes a third opening 63 at one side of the rectangular parallelepiped, but an insulator 9 of the second exemplary embodiment is formed by an insulating film attached onto the outer surface of the first case 35. That is, the insulator 9 does not have a configuration corresponding to the third opening 63 of the first exemplary embodiment and is formed in a closed structure. The attachment structure of the first case 35 and the insulator 9 enables the assembling of the first case 35 and the insulator 9 as a first process.

In the rechargeable battery 300 of the third exemplary embodiment, since the first and second cases 35 and 15 face each other with the insulator 9 located therebetween on six surfaces, a short circuit may be formed with respect to the infiltration of the conductive foreign material or press fracture in all directions of x, y, and z axes. Accordingly, the safety of the rechargeable battery 300 may be further improved.

Figure 10:
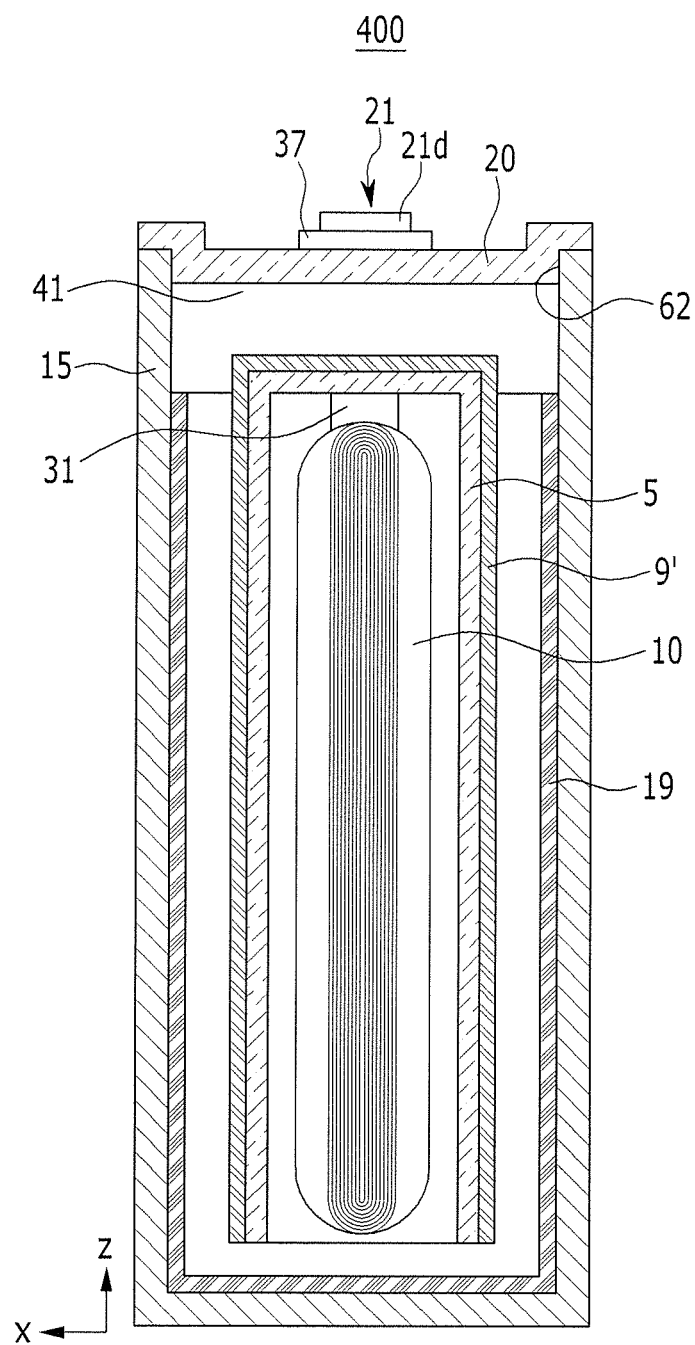
FIG. 10 is a cross-sectional view of a rechargeable battery according to a fourth exemplary embodiment of the present invention.

FIG. 10 is a cross-sectional view of a rechargeable battery 400 according to a fourth exemplary embodiment of the present invention. Referring to FIG. 10, an insulator 19 is formed on the inner surface of the second case 15 having the first opening 61 by an oxide film or coating film. Further, the first case 5 may further include an insulator 9' which is formed by an oxide film or a coating film on the outer surface thereof. Insulators 19 and 9' further improve electrical insulating properties of the second and first cases 15 and 5.

Figure 11:
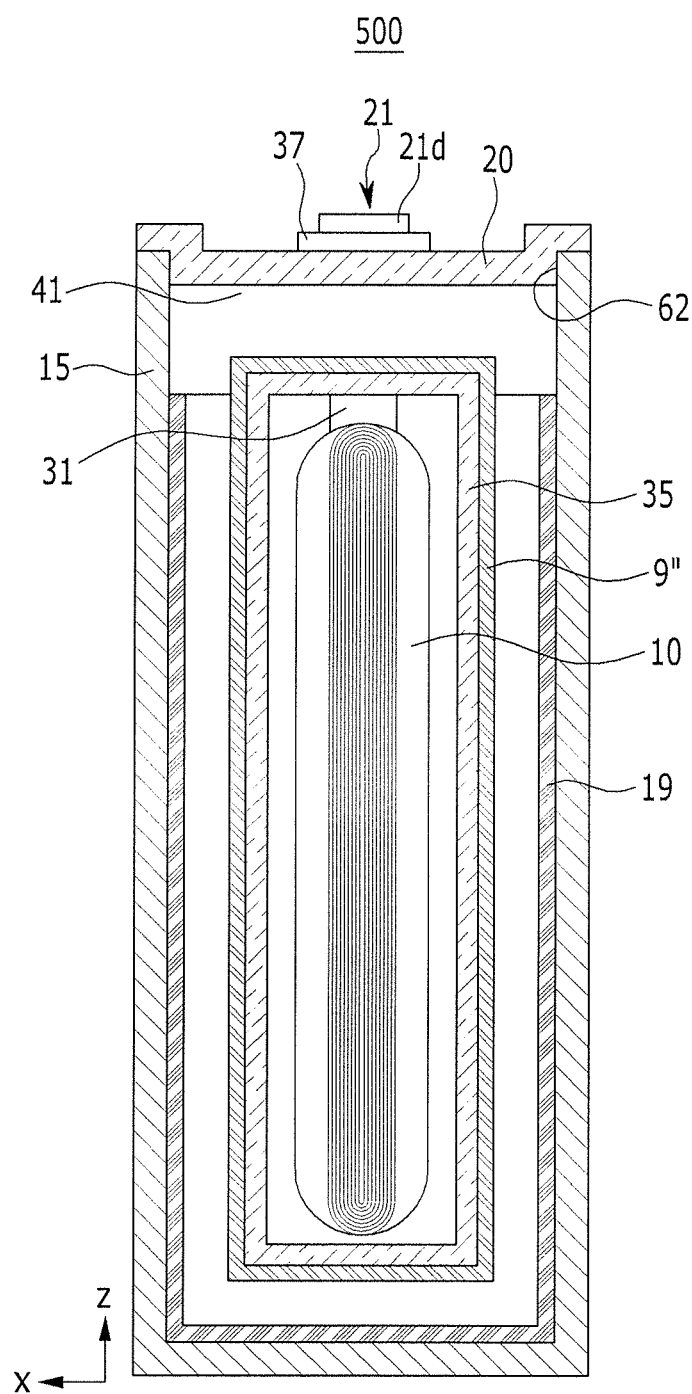
FIG. 11 is a cross-sectional view of a rechargeable battery according to a fifth exemplary embodiment of the present invention.

FIG. 11 is a cross-sectional view of a rechargeable battery according to a fifth exemplary embodiment of the present invention. Referring to FIG. 11, an insulator 9" is formed on the outer surface of the first case 35 having the rectangular parallelepiped shape without a first opening by an oxide film or coating film.

Further, the second case 15 includes the insulator 19 which is formed by the oxide film or coating film on the inner surface thereof. Insulators 19 and 9" may improve electrical insulating properties of the second and first cases 15 and 35.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Description of Symbols

| | |
|---|---|
| 5, 35: First case | 7, 8, 9, 9', 9", 19: Insulator |
| 10: Electrode assembly | 11: First electrode (negative electrode) |
| 11a, 12a: Uncoated region | 12: Second electrode (positive electrode) |
| 13: Separator | 15: Second case |
| 20: Cap plate | 21, 22: First, second terminal (negative, positive terminal) |
| 21a, 22a: Pole portion | 21b, 22b: Flange |
| 21d, 22d: Terminal plate | 24: Vent hole |
| 25: Vent plate | 25a: Notch |
| 27: Sealing plug | 29: Electrolytic solution inlet |
| 31: First electrode lead tab (negative lead tab) | 36: Negative gasket |
| 37: Negative insulator | 38: Top plate |
| 39: Positive gasket | 32: Second electrode lead tab (positive lead tab) |
| 41: First electrode insulating member (negative insulating member) | |
| 42: Second electrode insulating member (positive insulating member) | |
| 51, 71: Through-hole | 61, 62: First, second opening |
| 63, 83: Third opening | |
| 100, 200, 300, 400, 500: Rechargeable battery | |
| 311, 312: First, second terminal hole | 421, 422: Suspending portion |

What is claimed is:

1. A rechargeable battery, comprising:
   an electrode assembly comprising a first electrode and a second electrode;
   a first case housing the electrode assembly and electrically coupled to the first electrode, the first case being a rectangular parallelepiped having a first opening at one side configured to receive the electrode assembly; and
   a second case electrically insulated from the first case and housing the first case, wherein the second case is electrically coupled to the second electrode, the second case being a rectangular parallelepiped having a second opening generally opposite to the first opening, the second opening configured to receive the first case.

2. The rechargeable battery of claim 1, further comprising an insulator located between the first case and the second case.

3. The rechargeable battery of claim 2, wherein the insulator comprises an insulating film, an oxide film, or a coating film.

4. The rechargeable battery of claim 1, further comprising a cap plate coupled to the second opening of the second case, wherein the first case is electrically coupled to a first electrode terminal coupled to the first electrode, and
   wherein the second case is electrically coupled to a second electrode terminal coupled to the second electrode.

5. The rechargeable battery of claim 4 further comprising a first electrode insulating member and a second electrode insulating member on the cap plate and a first electrode lead tab electrically coupled to the first electrode, wherein the first case is between the first electrode insulating member and the first electrode lead tab and is on the second electrode insulating member, and wherein the second electrode insulating member is outside of the first case.

6. The rechargeable battery of claim 5, further comprising an insulator located between the first case and the second case.

7. The rechargeable battery of claim 6, wherein the insulator is a rectangular parallelepiped having a third opening generally corresponding to the first opening, wherein the insulator is fixed between the first case and the first electrode insulating member, and wherein the insulator is outside of the second electrode insulating member and is on the first case.

8. The rechargeable battery of claim 6, wherein the insulator is an oxide film or a coating film on the second case.

9. The rechargeable battery of claim 6, wherein the insulator is a rectangular parallelepiped having a third opening generally corresponding to the second opening.

10. The rechargeable battery of claim 1, wherein the first case comprises copper and wherein the second case comprises aluminum.

11. The rechargeable battery of claim 1, further comprising an insulator located between the first case and the second case, wherein the insulator is an insulating film attached to the first case.

12. The rechargeable battery of claim 1, further comprising an insulator located between the first case and the second case, wherein the insulator is an oxide film or coating film on the first case.

* * * * *